United States Patent [19]
Barstow et al.

[11] Patent Number: 5,671,347
[45] Date of Patent: *Sep. 23, 1997

[54] METHOD AND APPARATUS FOR BROADCASTING LIVE EVENTS TO ANOTHER LOCATION AND PRODUCING A COMPUTER SIMULATION OF THE EVENTS AT THAT LOCATION

[76] Inventors: David R. Barstow, 107 Laura La., Austin, Tex. 78746; Daniel W. Barstow, 99 Pine Point Rd., Stow, Mass. 01775

[*] Notice: The term of this patent shall not extend beyond the expiration date of Pat. No. 5,526,479.

[21] Appl. No.: 660,891

[22] Filed: Jun. 10, 1996

Related U.S. Application Data

[63] Continuation of Ser. No. 920,355, Jul. 29, 1992, Pat. No. 5,526,479, which is a continuation-in-part of Ser. No. 542,990, Jun. 25, 1990, abandoned.

[51] Int. Cl.$^6$ .................................................. G06F 9/455
[52] U.S. Cl. ................................................................ 395/173
[58] Field of Search .............................. 395/152, 154, 395/173, 806; 345/122; 369/29; 358/402; 364/410, 514

[56] References Cited

U.S. PATENT DOCUMENTS

| | | | |
|---|---|---|---|
| 4,695,953 | 9/1987 | Blair et al. | 364/410 |
| 4,794,534 | 12/1988 | Millheim | 364/420 |
| 4,827,404 | 5/1989 | Barstow et al. | 395/952 X |
| 4,901,260 | 2/1990 | Lubachevsky | 364/578 |
| 4,954,969 | 9/1990 | Tsumura | 395/609 X |
| 4,956,787 | 9/1990 | Ito et al. | 395/952 X |
| 4,962,463 | 10/1990 | Crossno et al. | 395/806 |
| 5,063,523 | 11/1991 | Vrenjak | 364/514 |
| 5,083,271 | 1/1992 | Thacher et al. | 364/411 |
| 5,086,402 | 2/1992 | Sterling, II | 364/514 |
| 5,127,044 | 6/1992 | Bonito et al. | 379/88 |
| 5,187,787 | 2/1993 | Skeen et al. | 395/680 |
| 5,195,092 | 3/1993 | Wilson et al. | 370/94.2 |
| 5,220,516 | 6/1993 | Dodson et al. | 364/514 |
| 5,274,758 | 12/1993 | Beitel et al. | 395/807 |
| 5,327,361 | 7/1994 | Long et al. | 364/57 |
| 5,533,181 | 7/1996 | Bergsneider | 395/152 |

OTHER PUBLICATIONS

Rymer, MetaCourier, Patricia Seybold's Network Monitor Jul. 1, 1990 pp. 16 to 25.

Gipp. 20,000 Leagues written in C, Mac User, Feb. 1989, p. 345.

*Primary Examiner*—Anton W. Fetting
*Attorney, Agent, or Firm*—Kenyon & Kenyon

[57] ABSTRACT

A live event may be broadcasted by producing a computer coded description of the sub-events that constitute the event. The coded description is stored in a centralized computer data base and the information thus stored is accessible by a viewer's computer. That viewer computer then produces a computer simulation of the live event using the coded description.

18 Claims, 13 Drawing Sheets

OBSERVER WITH COMPUTER    ENCODED DESCRIPTION    DATABASE COMPUTER    TRANSMISSION    VIEWER WITH COMPUTER

EVENT_IDENTIFIER    IN_PROGRESS    NUMBER_OF_SUBEVENTS
     { SUBEVENT_NUMBER    START_TIME    END_TIME
     [ START_TIME STOP_TIME ACTION_TYPE PARAMETER_VALUE PARAMETER_VALUE . . .]
     [ START_TIME STOP_TIME ACTION_TYPE PARAMETER_VALUE PARAMETER_VALUE . . .]
     . . .
     }
     . . .

EVENT_IDENTIFIER  START  START_TIME
      (a) MESSAGE AT START OF EVENT
EVENT_IDENTIFIER  END  END_TIME
      (b) MESSAGE AT END OF EVENT
EVENT_IDENTIFIER  { SUBEVENT_NUMBER . . .}
      (c) MESSAGE FOR SUBEVENT
FIG. 4
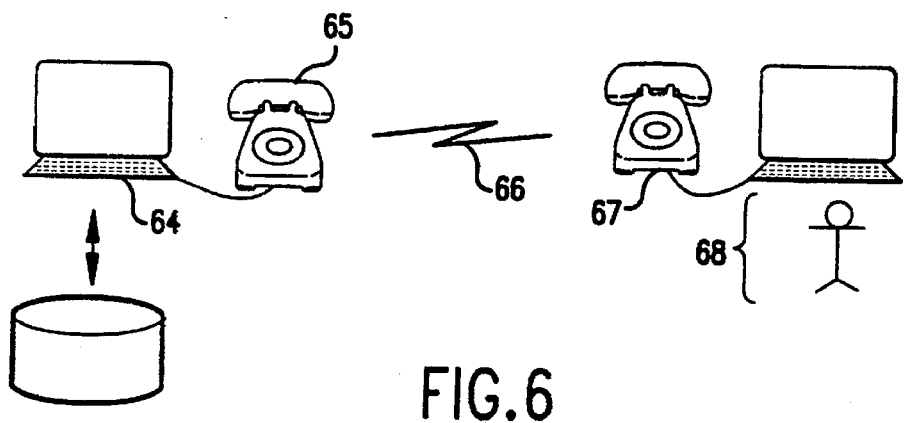
FIG. 6
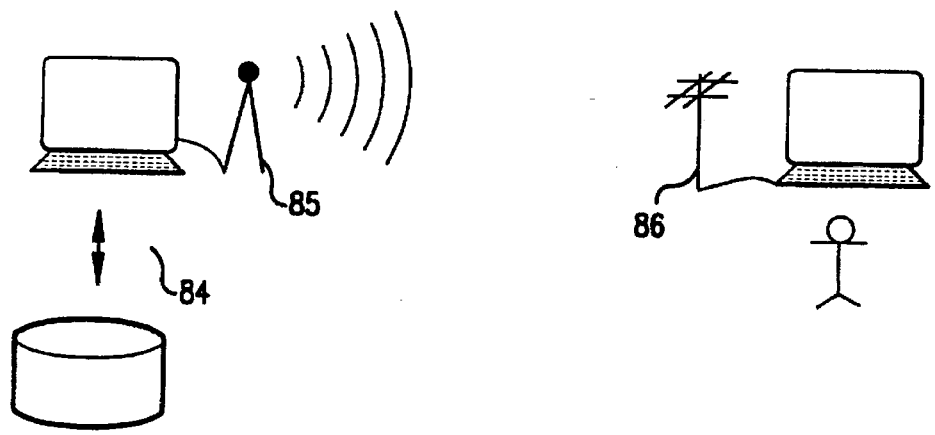
FIG. 8

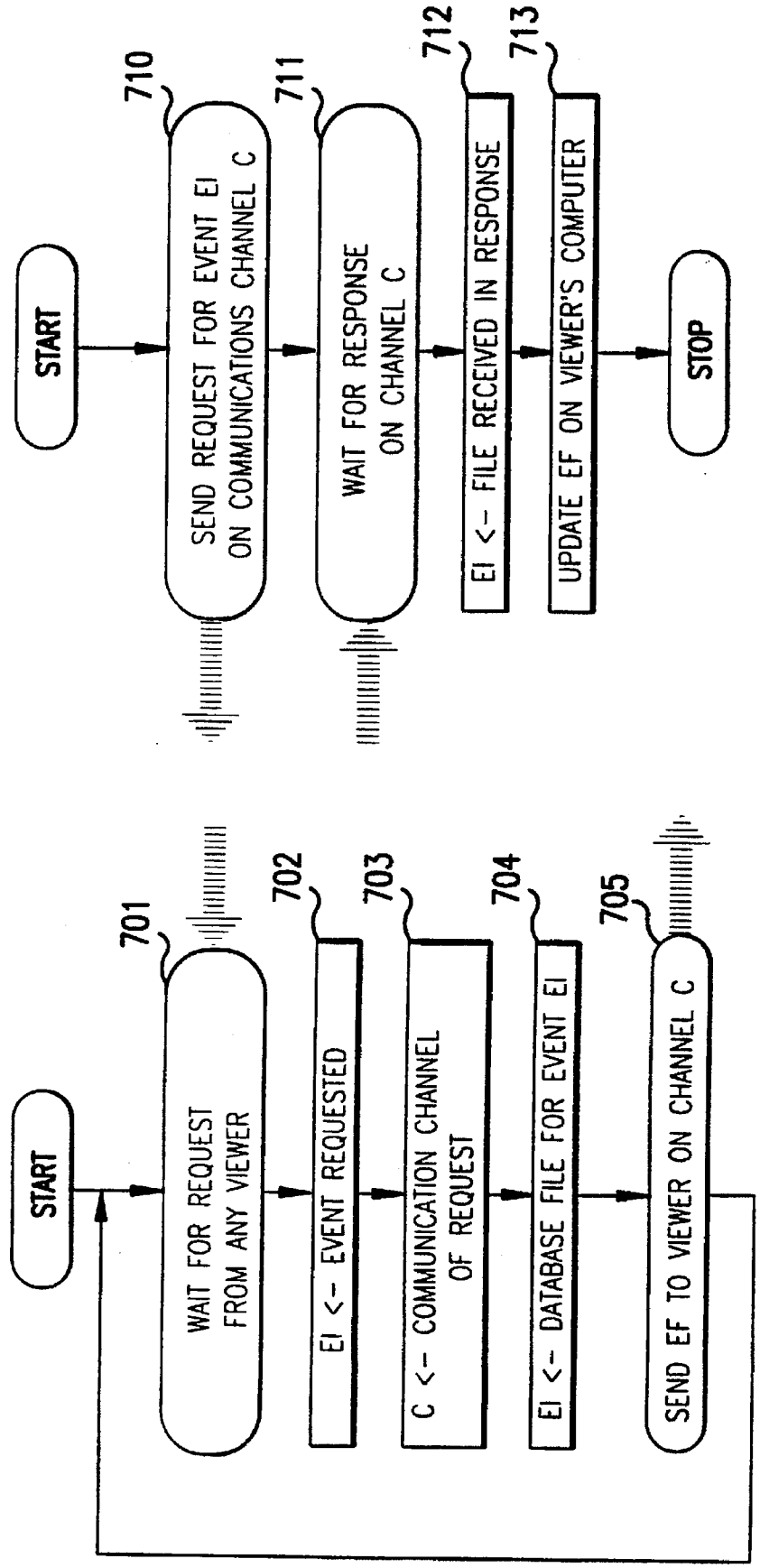

CAUGHT BY THE LEFT FIELDER!

...DEEP TO LEFT...

METHOD AND APPARATUS FOR BROADCASTING LIVE EVENTS TO ANOTHER LOCATION AND PRODUCING A COMPUTER SIMULATION OF THE EVENTS AT THAT LOCATION

This is a continuation of application Ser. No. 07/920,355 filed 29 Jul., 1992, U.S. Pat. No. 5,526,479, which is a continuation-in-part of application Ser. No. 07/542,990 filed Jun. 25, 1990, abandoned.

BACKGROUND OF THE INVENTION

1. Field of the Invention

The present invention relates to a method for broadcasting and viewing live events. In particular, the present invention utilizes computer simulation techniques to characterize the actions of a live event and broadcasts those computer characterizations to viewers who desire such information. The event is then simulated by the viewer's computer, utilizing the computer simulation characterizations of the actions of the event and known simulation techniques.

2. Related Art

The broadcasting of live events is well-known. Most commonly live events are broadcast as audio information or a combination of video and audio information utilizing either radio transmission techniques or television transmission techniques, respectively. There are limitations to both of these broadcasting techniques. Radio broadcasting provides no visual representation of the action being described. Video information of a television transmission is restricted by the angle of the television camera selected for transmission of a particular action within the event. In addition, unless the observer video tapes a television transmission or audio tapes a radio transmission, there is no possibility for replaying actions that occur within the event and there is no capability for the viewer to view or listen to only selected portions of the event, to review selected portions of the event, or to view the event at the viewer's leisure.

It is also well known to utilize computers to simulate activities. In particular, computer simulation techniques to represent the testing of the operation of devices is well known. Thus, computer programmers familiar with simulation techniques are familiar with programs required for simulating activities on a computer. However, such simulation techniques have not been utilized in conjunction with the broadcast of live events, which can be represented as a sequence of well-defined actions.

SUMMARY OF THE INVENTION

The present invention is directed to a method for broadcasting live events which overcomes the shortfalls of radio and television broadcasting. In particular, the present invention utilizes computer simulation techniques to characterize the actions of a live event, providing symbolic representations for the actions of the event rather than direct audio or visual signals. According to the method there is a broadcast of those characterizations. The live event can then be simulated at a remote location utilizing the characterizations or symbolic representations.

This broadcasting method has at least four advantages over other live broadcast techniques. First, the viewer may view the event at any time and may repeatedly view parts of the event. Secondly, the viewer can select a visual perspective for a given action within the event and can also choose to have information about the event displayed in graph or chart form rather than as visual images. Third, the user of the system is capable of monitoring a plurality of events simultaneously. Fourth, the method of the present invention results in using less bandwidth to broadcast a live event than is typically utilized for either radio or television broadcasts of such an event.

In a method according to the present invention, an event, is characterized as a sequence of sub-events constituted by a discrete number of actions selected from a finite set of action types which define the nature of the event. Each action is definable by its action type and from zero to possibly several parameters associated with that action type. The event may be observed by an observer who attends or watches the event and monitors each of the actions which occurs in the course of the event. The observer enters associated parameters for each action which takes place during the event. The event is thus represented by a sequence of sub-events each described by a sequence of characterizations of a plurality of actions in terms of parameters which are entered into an event file of a centralized data base computer which is accessible by the observer. The centralized data base computer may either be located at the site of the event or at a remote location and the information can be transmitted by the observer to the centralized data base computer. In either alternative, the observer, having access to a computer, encodes the event as a series of actions having associated therewith various parameters which define the actions that have taken place. Once the encoded description is transferred to an event file of the centralized data base computer, it is accessible by a viewer. Once accessed by a viewer these encoded descriptions of the actions of the event will then be utilized by the viewer's computer to reconstruct the actions of each sub-event of the selected event by using the parameter information associated with each action. The actions can be represented to the viewer either with visual images, audio images, or text, or some combination thereof.

The viewer will be able to select a perspective view for a visual image that is displayed on the display device associated with the viewer's computer. In addition, the viewer will be able to replay any portion of the event as already stored in an event file of a viewer data base at the viewer's computer. Furthermore, the viewer will be able to update the viewer computer data base with event information from the centralized data base computer at any time. In addition, the viewer's computer will be able to access the action information of a plurality of events from the centralized data base computer and store such information in a viewer file, permitting the viewer to select from any one of the plurality of events for view. The viewer will also be able to interrupt the display of the event on the viewer's computer at any time and return to any action within the event once it is stored in the viewer's computer data base.

One such typical event would be a sporting event such as a baseball game. It is also possible to utilize this system with such events as the activities involving a stock market, an election, an auction and any other event where a finite set of possible action types can be defined prior to the beginning of the event.

BRIEF DESCRIPTION OF THE DRAWINGS

FIGS. 4(a) to 4(c) are illustrations of textual formats of messages sent by the observer's computer implementing the method of the present invention.

FIG. 6 illustrates a transmission technique for transmitting information between a centralized data base computer and a viewer's computer in accordance with the method of the present invention.

FIGS. 7(a) and (b) are flow charts for an algorithm for the two-way communication illustrated in FIG. 6.

FIG. 8 illustrates a transmission technique for one-way communication between a centralized data base computer and a viewer's computer.

DETAILED DESCRIPTION OF THE PRESENT INVENTION

Figures 1, 2:
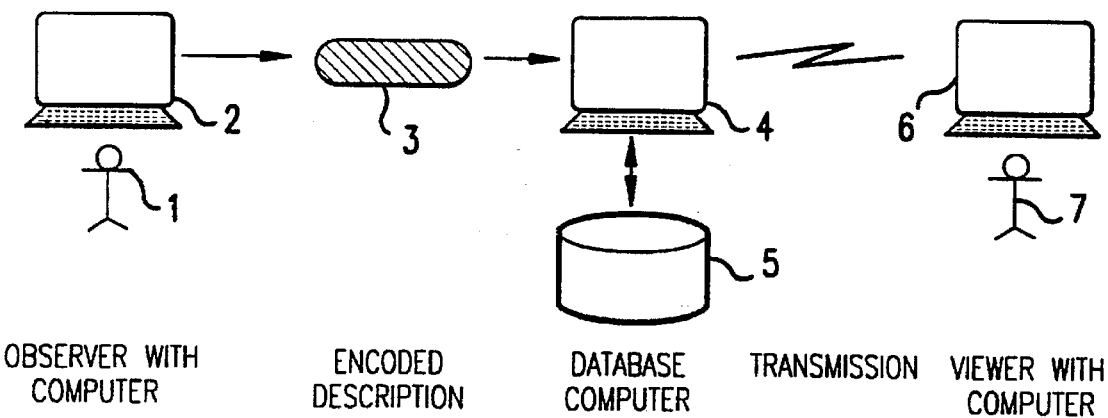
FIG. 1 is a pictorial representation of a transmission system utilizing the broadcast method of the present invention.
FIG. 2 is an example of a textual representation of an event in accordance with the method of the present invention.

FIG. 1 illustrates the elements for use in a system for carrying out the broadcast method of the present invention. In FIG. 1 an observer 1 with a computer 2 observes a live event (not shown) which can be described as an ordered sequence of discrete sub-events, with each sub-event consisting of a set of actions. Each action is a parameterized instance of one of a finite set of action types. The observer enters the actions into the observer computer 2 resulting in an encoded description 3 of the event as a series of sub-events, each sub-event consisting of parameterized actions. The encoded description will be transmitted to a centralized data base computer 4. The data base computer has a data base file 5 associated with a given event and stores the sequence of sub-events as received from the observer computer. A viewer 7 with a computer 6 will be able to access the data base file 5 associated with a particular event from the centralized data base computer 4. The viewer 7 has a computer 6 and receives a transmission of the sequence of sub-events stored in an event file of the data base file 5 corresponding to the desired event. The viewer 7 then selects the type of display warranted for the event in question, either a textual display, or a visual display, or visual-audio display. The viewer's computer 6 then operates on the encoded description transmitted by the centralized data base computer 4 so as to produce the desired report of the event.

It is possible to have a plurality of observers 1 with computers 2 at a plurality of events with the encoded description of each event being transmitted by the associated observer and the observer's computer to the centralized data base computer 4. The viewer 7 may then select from the data base computer that event which is of interest, or can access all of the information with respect to all of the events and continue to update all events in the viewer's computer 6 while viewing only one event at a given time.

The encoded description of the event is written in a special-purpose computer language designed specifically for the purpose of describing events to be broadcast. The design and use of such special-purpose computer languages is well known to those skilled in the art of software development. The technique is discussed, for example in "Programming Pearls", John Bentley, Communications of the ACM, August 1986, Vol. 29, No. 8, pp. 711–721). Bentley refers to such languages as "little languages". At p. 711 of the article Bentley states:

> When you say "language," most programmers think of the big ones, like FORTRAN or COBOL or PASCAL. In fact, a language is any mechanism to express intent, and the input to many programs can be viewed profitably as statements in a language. This column is about those "little languages."
>
> Programmers deal with microscopic languages every day. Consider printing a floating-point number in six characters, including a decimal point and two subsequent digits. Rather than writing a subroutine for the task, a FORTRAN programmer specifies the format F6.2, and a COBOL programmer defines the picture 999.99. Each of these descriptions is a statement in a well-defined little language. While the languages are quite different, each is appropriate for its problem domain: although a FORTRAN programmer might complain that 999999.99999 is too long when F12.5 could do the job, the COBOLer can't even express in FORTRAN such common financial patterns as $.$$$.$$9.99. FORTRAN is aimed at scientific computing. COBOL is designed for business.

Bentley provides further details at p. 715:

> So far I've used the term "little languages" intuitively: the time has come for a more precise definition. I'll restrict the term computer language to textual inputs (and thus ignore the spatial and temporal languages defined by cursor movements and button clicks).
>
> A computer language enables a textual description of an object to be processed by a computer program.
>
> The object being described might vary widely from a picture to a program to a tax form. Defining "little" is harder. It might imply that a first-time user can use the system in a half an hour or master the language in a day, or perhaps that the first implementation took just a few days. In any case, a little language is specialized to a particular problem domain and does not include many features found in conventional languages.

Note that according to Bentley's definition, such a special-purpose language need not be a programming language used to define algorithms and computations. It may also be a means to describe something, as in the present invention, in which a special-purpose language is used to describe events.

In the present invention, the encoded description of the event includes an ordered sequence of sub-events. As constructed, each sub-event is identified by a number and the sub-event descriptor includes the number of that particular sub-event. In addition the sub-event descriptor identifies the start time of the sub-event and the end time in connection with the live event. Each sub-event descriptor also includes a set of one or more actions. Each action has associated therewith a tag indicating the begin and end times of the action, the type of action taking place, as well as values for parameters associated with the designated type of action. The types of actions and the parameters depend upon the nature of the real event.

The types of actions and the parameters depend upon the nature of the real event. That is, for any particular type of event, the practitioner of the present invention determines a set of types of actions and parameters that are appropriate to the type of event and to the degree of sophistication desired. Techniques for identifying the set of types of actions and parameters for any particular type of event are well known to those skilled in the art of special-purpose languages. For example, Bentley provides several guidelines (p. 720): "test your design by describing a wide variety of objects in the proposed language. . . . iterate designs to add features as dictated by real use." Of course, in the present invention, the sub-event sequence described above provides the general structure of the language design, so the practitioner need only identify the types of actions and parameters that will appear in the sub-event descriptions for the particular type of event. It will of course be possible to use the encoded description either to describe an entire sequence of sub-events of an entire event after it has ended or describe an initial subsequence of sub-events prior to the completion of the event. It will be possible with this encoding scheme to continuously update the data base file of the centralized data base computer with encoded descriptions of the event as it transpires, rather than waiting until the completion of the event.

FIG. 2 illustrates one possible textual representation of an event as it could be entered into the observer's computer to create information regarding the event. First, there is associated with a given event, an event identifier, so that a viewer can later select from a plurality of events which are updated by the centralized data base computer. Whether or not the event is still in progress will also be noted. In addition, the textual representation provides an indication of the number of sub-events which have occurred so far in the event. Each subevent is identified by a number and has a start time and an end time in relation to the event. Associated with each sub-event are one or more actions where each action has associated therewith an identifier to identify the start and stop times of the actions in the sub-event. Each action is of a particular action type and will be identified by an action type tag. Each action type may have associated therewith zero or more parameters. Therefore, the list of actions for a particular sub-event number is set forth as one or more actions where each action is described by its start and stop times, an action type descriptor and a value for the parameters which are associated with that action type, if any. This textual representation of an event could be constructed by an observer utilizing a computer while observing the action occurring during an event. This representation is then used for internal processing purposes. The advantage of a textual representation such as this is that textual characters are a standard form of interchange between computers and hence standard communication mechanisms may be used to communicate between the observer's computer, the database computer and the viewer's computer.

Figure 3:
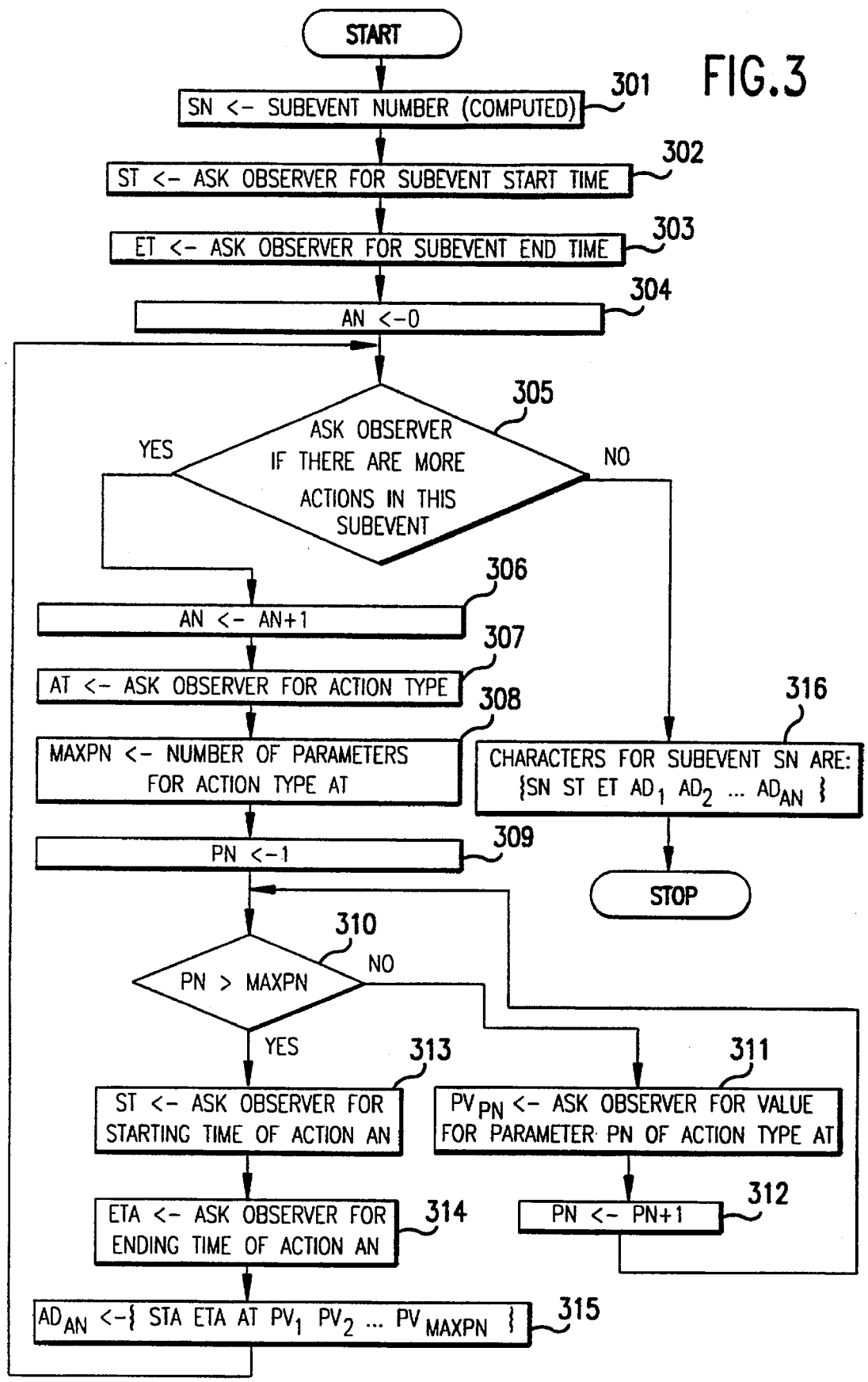
FIG. 3 is a flow chart of an algorithm usable by an observer in implementing the method of the present invention.

Entering this encoded description by typing could be cumbersome depending on the number of actions involved in a subevent and the speed of the event being observed. Another possible technique for recording the event would be to use prompts generated by a special purpose software developed to assist the observer. The software provides a menu of possible action types and prompts an observer for relevant information about start and stop times and parameters after an action type is selected. A flow chart illustrating an algorithm for the special purpose software is set forth in FIG. 3.

At step 301, the sub-event number SN is provided by the observer's computer. At step 302, the computer asks the observer for a start time (ST) for the sub-event identified as SN. At step 303, the computer asks the observer for an end time (ET) for the sub-event. An action number AN initially is set to "O" at step 304. The computer then asks the observer if there are any more actions occurring in this sub-event at decision step 305. If there are additional actions in this sub-event, then the action number AN is incremented by 1 at step 306 and the computer asks the observer for the identification of the action type AT. Once the action type AT is selected, the observer's computer, in step 308, retrieves the maximum number of parameters for actions of the type identified in step 307. The maximum number of parameters is identified as MAXPN. The parameter number PN then is set to 1 in step 309. Decision step 310 compares the parameter number PN to the value of MAXPN, the number of parameters for the given action type. So long as the maximum number of parameters has not been exceeded, the observer asks for a parameter value associated with the parameter number PN of action AT. This is step 311. After the observer enters the parameter value PVPN~ the parameter number PN is incremented by 1 in step 312 and the comparison decision of step 310 is carried out again. This loop continues until PN exceeds the MAXPN, the maximum number of parameters for the action type defined. Then decision step 310 jumps to step 313 at which time the computer asks the observer for the start time of action AN. In step 314, the computer asks the observer for the stop time of action AN. Then at step 315 the computer defines a sequence of characters, ADAN, as the sequence of characters representing the action, namely the start time, stop time, the action type and the parameter values associated with that action. The algorithm continues to step 305 in which a decision is made as to whether the observer has any additional actions to enter with regard to the sub-event. The loop of steps 305 to 315 continues until the observer has no additional actions to enter with regard to the identified sub-event. At this point, the characters for sub-event SN are set as the sub-event number, start and end times of the sub-event and the sequence of action descriptors in step 316.

It is also possible that the special user software could employ graphically-oriented techniques to additionally support the observer. For example, if a required parameter is the name of a participant in the event, the software prompts the observer with a complete list of participants and asks the observer to select one participant from the list. Furthermore, if a location is a parameter associated with an action, then the observer's computer may present a diagram of the site, and permit the observer, by use of a pointing device, such as a mouse, to point to the relevant location on the diagram to correspond to the parameter. Such prompting and pointing techniques in software are well-known.

Once the observer has constructed the encoded description of the sub-event, the description is sent to a centralized data base computer 4 as illustrated in FIG. 1. The data base computer receives this updated sub-event information from the observer's computer and appends it to the sequence of sub-events associated with the given event as stored in the centralized data base computer file 5. This updating is best accomplished by maintaining a permanent communications link between the observer's computer and the centralized data base computer. If a textual representation of the encoded sub-event description is to be utilized, such as that illustrated in FIG. 2, then standard communications software is used to transmit the appropriate sequence of characters. Thus, the sequence of sub-events stored in the data base computer file 5 will always be complete and accurate shortly after the actual sub-event has occurred.

FIGS. 4(a) to 4(c) illustrate a textual format of messages from an observer's computer. FIG. 4(a) illustrates the format of a message to be sent at the beginning of an event. The message includes an event identifier and a start time for the event. FIG. 4(b) illustrates a message to be constructed by the observer at the end of the event, including the event identifier and the designation of an end time to the event. Furthermore, during the course of the event, the observer sends sub-event messages illustrated in FIG. 4(c), including an event identifier, and then the sub-event number and sequence of associated information as described with respect to FIG. 3 above.

Figure 5A:
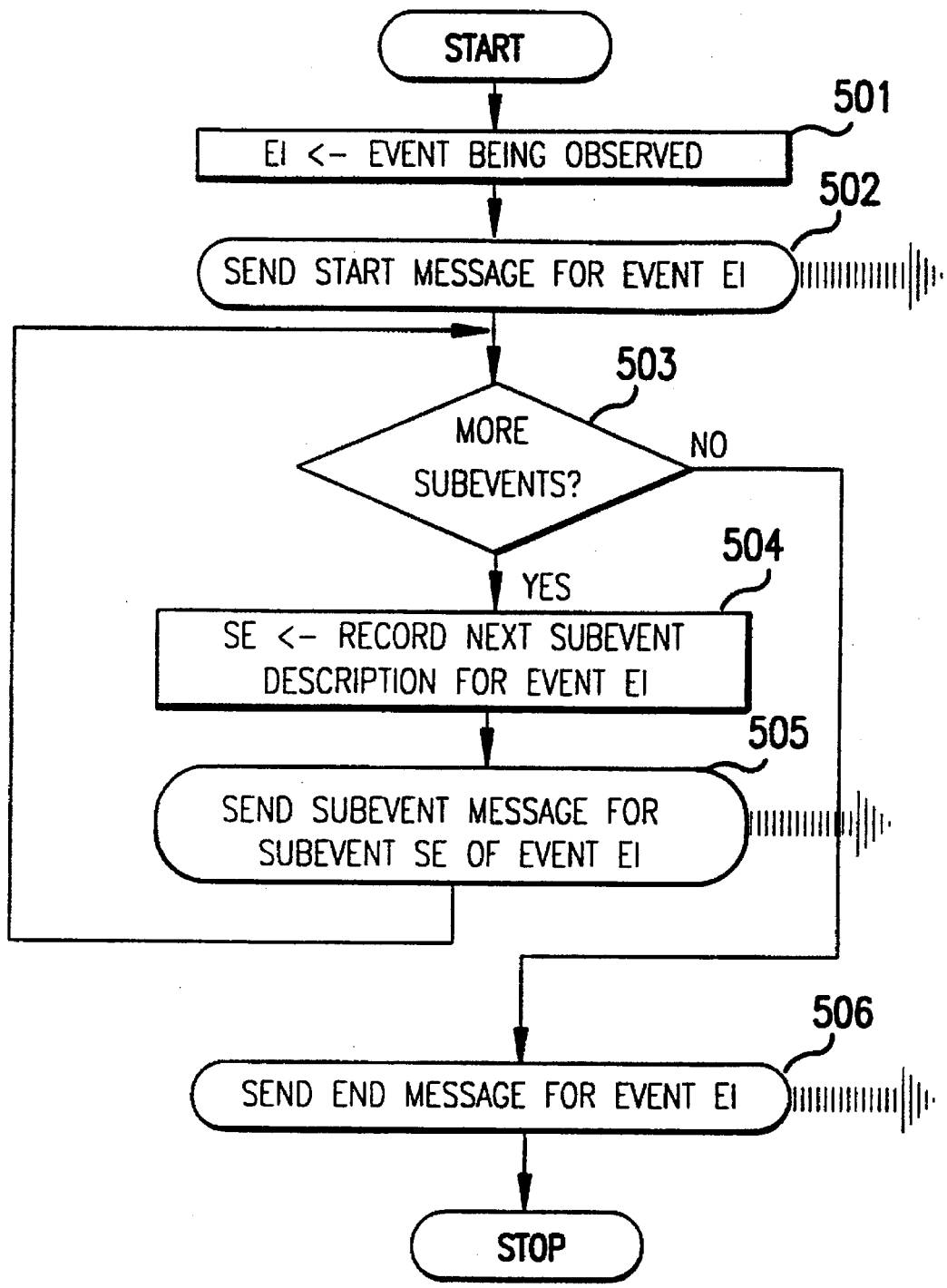
FIGS. 5(a) and 5(b) are flow charts for algorithms to run on an observer's computer and a centralized data base computer, respectively, in accordance with the method of the present invention.
Figure 5B:
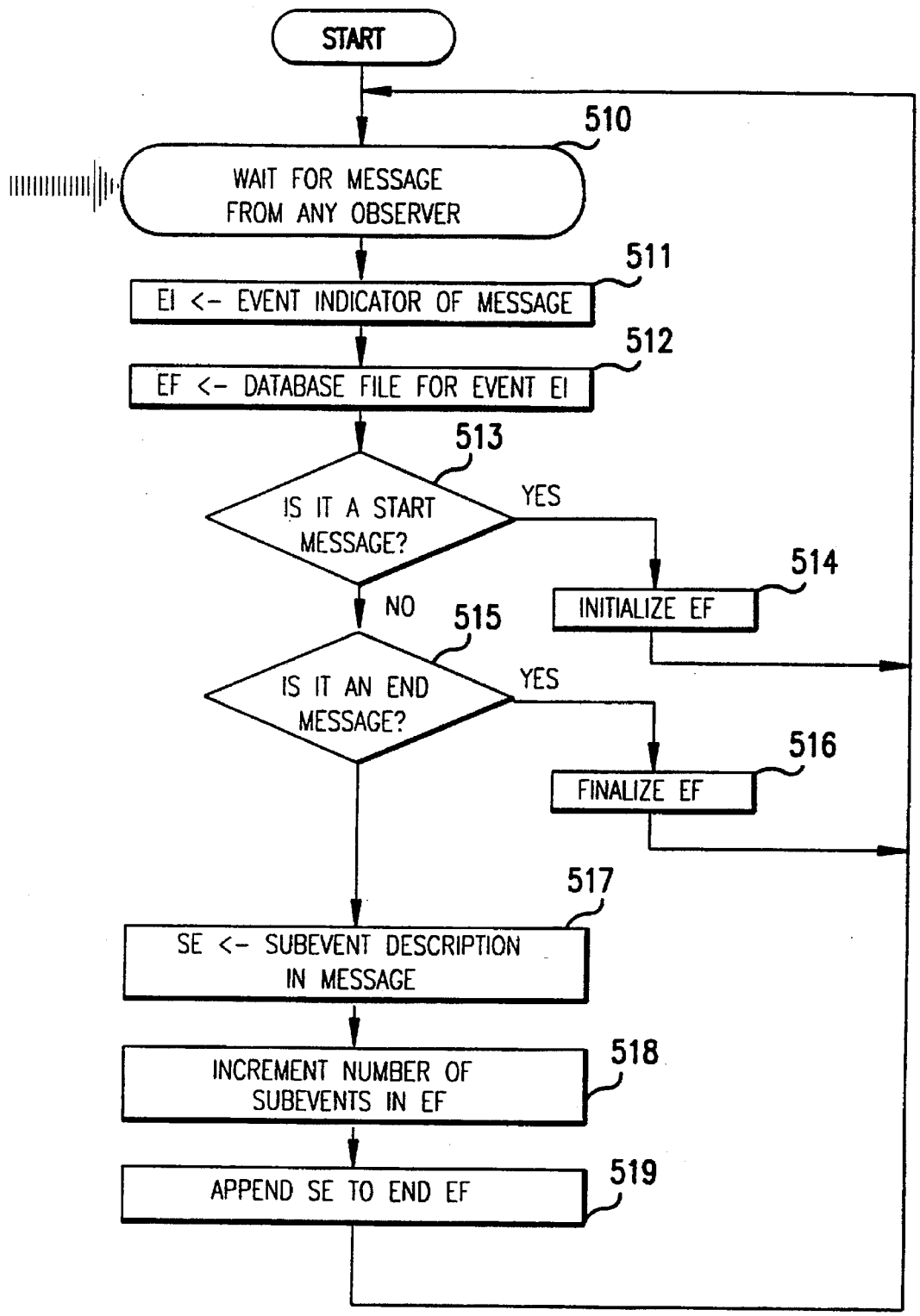

The centralized data base file 5 is able to store the sequences of sub-events for a plurality of different events as they are happening, simultaneously, by storing the information in separate files. Whenever information with regard to a particular event is received at the centralized computer data base, the file corresponding to that event is updated with the new sub-event information. FIGS. 5(a) and 5(b) illustrate the algorithms at the observer's computer 2 and the centralized data base computer 4 for updating a file of a given event as stored in the centralized data base computer file 5. FIG. 5(a) illustrates the flow chart of the algorithm to be utilized by the observer's computer, while FIG. 5(b) illustrates a flow chart of the algorithm utilized at the centralized data base computer 4.

In FIG. 5(a) in step 501, the event being observed is identified with an event identifier EI. In step 502, the identifier and a START message are sent by the observer to the centralized data base computer which, in step 510 is waiting for messages from any observer computers. Once an observer sends a START message for an event, the decision step 503 determines if there are any more sub-events. If so, the observer records the next sub-event description SE in step 504, in accordance with the algorithm described in FIG. 3. In step 505, the sub-event description of sub-event SE is then sent as a message associated with event EI. If, in step 503, the observer's computer detects that there are no more sub-events as indicated by the observer, then the observer's computer sends an END message for event EI as in step 506. Steps 502, 505 and 506 all send information to the centralized data base computer which, as stated above, waits for messages from any observer computer in step 510. The centralized data base computer then identifies the event indicator of the received message in step 511 and identifies, at step 512, the associated file EF on the data base computer that corresponds to EI. In step 513, the centralized data base computer determines whether the received message is a START message. If so, in step 514, the data base initializes file EF and then returns to the WAIT state, step 510, to await additional messages. If the message is not a START message, then the centralized data base computer decides whether the message received is an END message at step 515. If so, step 516 is executed and the file EF is finalized. The data base computer then enters the WAIT state of step 510. If the message received is neither an END message, nor a START message, then step 517 identifies the sub-event description SE received in the message from the observer computer. In step 518, the number of sub-events in EF is incremented and the sub-event description from the message SE is appended to the end of the file EF in step 519. The centralized data base computer then returns to the WAIT state of step 510.

Once the centralized data base file has been updated by the observer or observers at various events, the event data descriptive of the sub-events constituting a particular event are maintained in the updated centralized data base file for access of a viewer or viewers.

There are two basic techniques for transmitting encoded descriptions from the centralized data base computer to a viewer's computer. The first technique utilizes a two-way communication technology such as standard telephone connection technology utilizing modems attached to the viewer's computer and the centralized data base computer. This two-way communication scheme is illustrated in FIG. 6 of the application in which the data base computer 64 is connected by a telephone 65 through telephone line 66 to telephone 67, associated with the viewer's computer 68.

A flow chart illustrative of an algorithm for two-way communication is set forth in FIGS. 7(a) and 7(b) for the data base computer and the viewer's computer, respectively. The data base computer waits for a request from a viewer as shown at step 701. Once a request is received, the data base computer identifies the event identifier EI requested by the viewer in step 702. The centralized data base computer then identifies the communication channel of the request in step 703 and accesses the data base file corresponding to the event EI in step 704. In step 705, the data base computer sends data base file EF to the viewer on the selected channel C. In FIG. 7(b), the viewer's computer sends a request at step 710 asking for a particular file, identified as EI, via communications channel C. The viewer's computer then waits, in step 711, for a response on channel C as sent by step 705 of FIG. 7(a). The viewer then accesses the file received in the response EF in step 712 and in step 713 updates the corresponding file on the viewer's computer with the information transmitted to the viewer's computer in step 705 of FIG. 7(a).

The frequency of updates in the two-way communication scheme is controlled, not only in response to the updating by observers, but also by the frequency with which the viewer accesses the centralized data base computer. In the two-way communication scheme the viewer can request updates continually or at irregular intervals or even wait until the event is over and then access the information by requesting it from the centralized computer data base.

A second technique by which a viewer may access material regarding an event or have the viewer's computer data base updated utilizes a one-way broadcast technology such as radio, television or microwave, either through the air or through a cable. This technique is illustrated in FIG. 8 where the centralized data base computer 84 outputs updates of the event, based on updates received from the observer, through a transmitter, such as a broadcast transmitter 85, to be received at the viewer's computer location by antenna mechanism 86. The centralized data base computer thus uses a broadcasting device to repeatedly transmit the most recent version of the entire sequence of encoded sub-events of an event. Whenever the data base is updated to include new sub-events from the observer's computer, the data base begins broadcasting the entire sequence of the event, including the new sub-events as an update for viewers. A special receiving device is attached to the viewer's computer and receives the broadcast transmission and stores the encoded sequence of new sub-events on the viewer's computer.

The frequency of updating in the one-way communication scheme is determined by the frequency with which the centralized data base computer broadcasts encoded sequences. This frequency, in turn, depends upon the amount of information in the event descriptions and on the bandwidth of the broadcast technique. Even when the same broadcast channel is used for multiple simultaneous real events, the viewer's computer is typically updated within a few seconds of when the data base computer is updated by communication from the observer's computer.

Figure 9B:
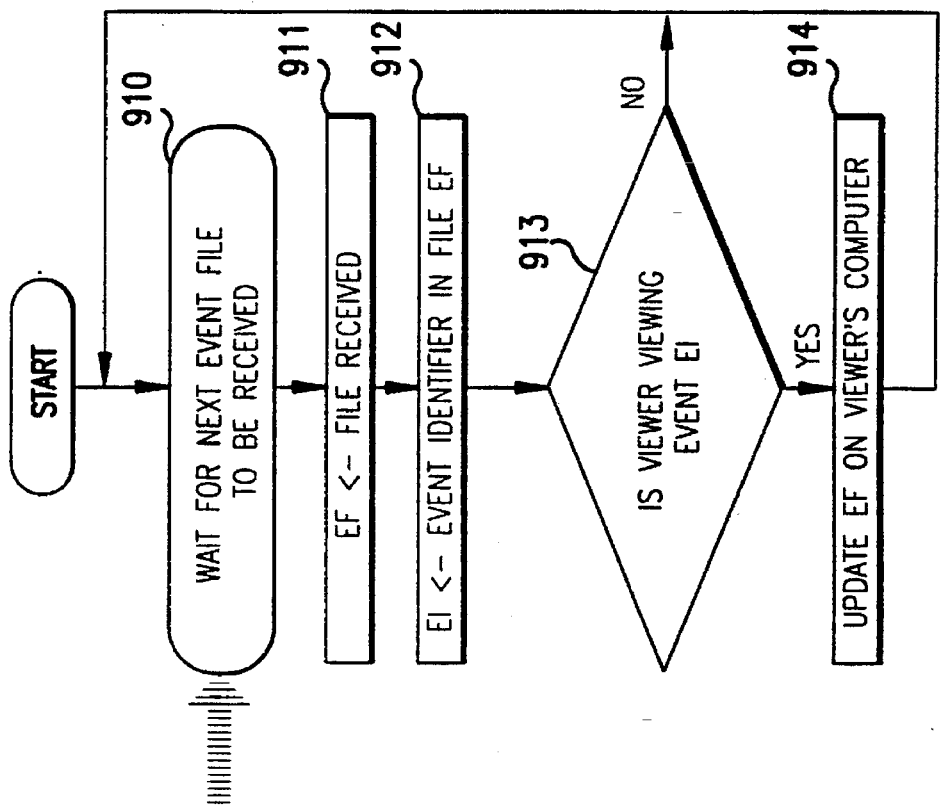
FIGS. 9(a) and 9(b) illustrate a flow chart of algorithms for the one-way communication illustrated in FIG. 8.
Figure 9A:
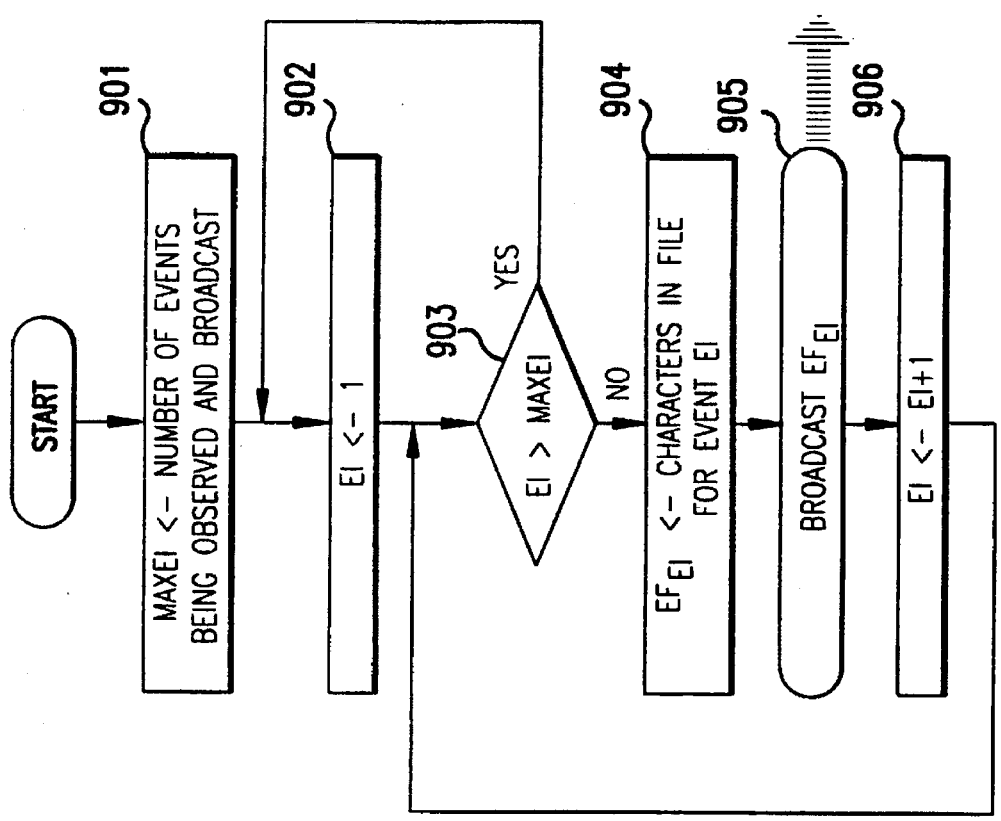

FIGS. 9(a) and 9(b) are flow charts illustrative of algorithms for the centralized data base computer and viewer's computer, respectively, for implementing a one-way communication.

At step 901, the centralized data base computer defines the maximum number of events being observed and broadcast as a value MAXEI and then, in step 902 of FIG. 9(a), selects data base event file EI number 1. In decision step 903, the number of EI is compared to MAXEI. If EI is greater than MAXEI, the broadcast is repeated for EI number 1 at step 902. If the number assigned to EI is not greater than MAXEI, then the characters in the file $EF_{EI}$ corresponding to event EI are accessed in step 904. In step 905, the accessed characters of $EF_{EI}$ are broadcast and in step 906, EI is incremented by 1 and the decision step of 903 is repeated.

The viewer's computer waits for the next event file to be received, as indicated at step 910 of FIG. 9(b). Once a broadcast of characters in a data base file EF is received, as indicated at step 911, an event identifier EI is accessed at step 912. In step 913, a decision is made as to whether the viewer is actually viewing the event identified by EI. If not, the event file may be discarded and the viewer's computer returns to the wait state of step 910. However, if the viewer is viewing event EI, then the corresponding event file on the viewer's computer is updated at step 914 with the characters from file EF received from the centralized data base computer.

Figure 10:
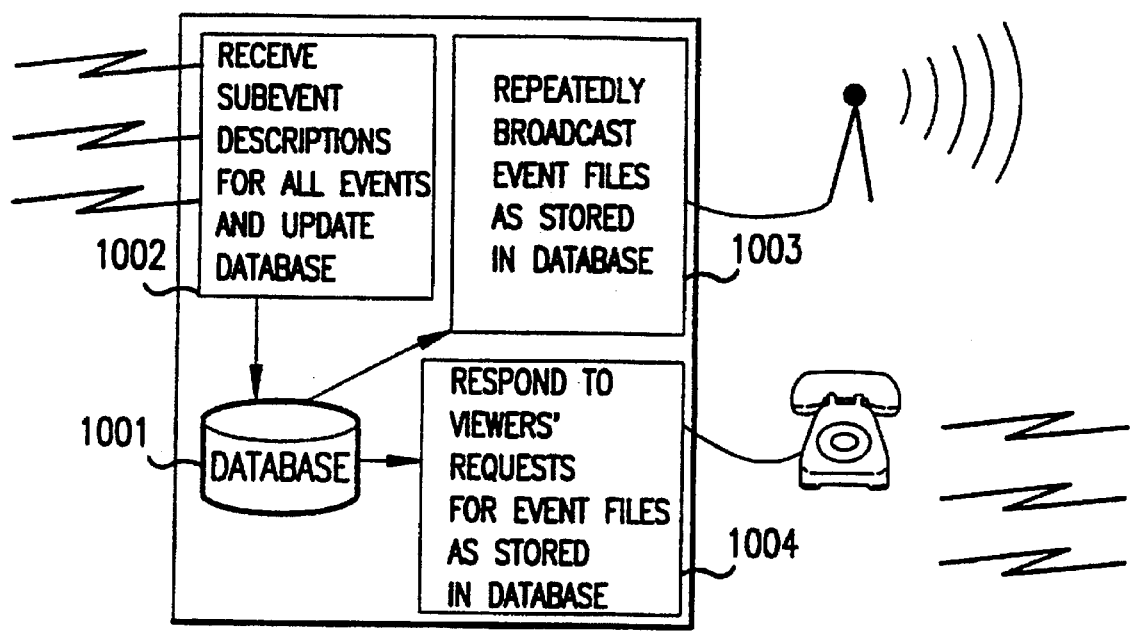
FIG. 10 illustrates in block diagram form, multi-processing in a centralized data base computer in accordance with the method of the present invention.

Regardless of the choice of algorithms for communication between the data base computer and the viewer, i.e., either one way or two-way communication, the algorithms expressed in the flow charts FIGS. 7(a) and 9(a) as corresponding to the algorithms of the centralized data base computer, are best implemented in a multi-processing manner. In particular, FIG. 10 illustrates a schematic block diagram of a multi-processing operation on a centralized data base computer. Data base 1001 is capable of interacting with the observers' computers and carrying out one-way and two-way communications with viewers' computers. Process 1002 receives the sub-event descriptions for all events and updates the data base of the centralized data base computer. Process 1003 repeatedly broadcasts event files stored in the data base according to a one-way communication scheme. Process 1004 carries out two-way communication between the centralized data base computer and a viewer by responding to viewers' requests for event files that are stored in the centralized data base computer.

The viewer's computer, regardless of the manner in which it receives information from the centralized data base computer, displays the encoded sequence of sub-events associated with a particular event by using techniques derived from those used for discrete event simulation. As discussed for example in SIMULATION MODELING AND ANALYSIS, Law et al.

Essentially, the viewer's computer performs at least two functions. First, it maintains a description of the status of the real event. Second, it shows each sub-event received from the centralized data base computer in either a graphical representation or a textual representation or an audio/visual representation.

The viewer's computer maintains a description of the status of the real event by using well-known techniques in the art of computer simulation and animation in discrete-event simulation. As discussed, for example, by Law et al.

The status of the real event is stored as the values of a set of status variables. One statue variable is used to store a current simulated time. A specific set of remaining variables to be used for any particular event depends on the nature of the event and the degree of detail which is desired. For example, a sporting event might include status variables for the names of the players, the current score, and information about the current game situation. Software on a viewer's computer includes a routine for displaying status variables. Depending upon the degree of sophistication desired, this may be as simple as a textual table, showing all status variables and their values, or it can be as complex as a graphical diagram in which the values of some status variables are indicated by pictorial icons on a background image, which suggests a view of the real event.

The values of all of the status variables are maintained by a variant of a standard simulation algorithm in which the system state is updated for each "event" in an "event list," in the temporal order in which the events occur. As described by Law et al. (pp. 6–8):

Although simulation has been applied to a great diversity of real-world systems, discrete-event models all share a number of common components and there is a logical organization for these components which promotes the coding, debugging, and future changing of a simulation model's computer program. In particular, the following components will be found in most discrete-event simulation models using the next-event time-advance approach:

System state. The collection of state variables necessary to describe the system at a particular time Simulation clock. A variable giving the current value of simulated time Event list. A list containing the next time when each type of event will occur Statistical counters. Variables used for storing statistical information about system performance Initialization routine. A subroutine used to initialize the simulation model at time zero Timing routine. A subroutine which determines the next event from the event list and then advances the simulation clock to the time when that event is to occur Event routine. A subroutine which updates the system state when a particular type of event occurs (there is one event routine for each type of event)

Report generator. A subroutine which computes estimates (from the statistical counters) of the desired measures of performance and prints a report when the simulation ends Main program. A subprogram which calls the timing routine to determine the next event and then transfers control to the corresponding event routine to update the system state appropriately.

The logical relationships (flow of control) between these components is shown in FIG. 1.2. The simulation begins at time zero with the main program's calling the initialization routine, where the simulation clock is set to zero, the system state and the statistical counters are initialized, and the event list is initialized. After control has been returned to the main program, it calls the timing routine to determine which type of event is most imminent. If an event of type i is the next to occur, the simulation clock is advanced to the time that event type i will occur and control is returned to the main program. Then the main program calls event routine i, where typically three types of activities occur: (1) updating the system state to account for the fact that an event type i has occurred, (2) gathering information about system performance by updating the statistical counters, and (3) generating the times of occurrence of future events and adding this information to the event list. After all processing has been completed, either in event routine i or in the main program, a check is made to determine (relative to some stopping condition) whether the simulation should now be terminated. If it is time to terminate the simulation, the report generator is called from the main program to compute estimates (from the statistical counters) of the desired measures of performance and to print a report. If it is not time for termination, control is passed back to the main program and the main program-timing routine-main program-event routine-termination check cycle is continually repeated until the stopping condition is eventually satisfied.

In the present invention, the simulation algorithm is applied to the actions of a sub-event. In particular, the "event list" of the Law et al. algorithm corresponds to the sequence of actions in the sub-event description, and a single "event" in the Law et al. algorithm corresponds to a single action. Note that the actions in the sub-event description are fixed for each sub-event, whereas the "event list" of the Law et al. algorithm is generated statistically during the simulation. In the present invention, there is also no need for the statistical counters or the report generator.

The "system state" of the Law et al. algorithm corresponds to the status variables of the present invention. Thus, the status variables are updated according to the actions of each sub-event, in the temporal order determined by the end times of the actions. In addition, since the status variables represent the state of the event, they are initialized at the beginning of the event, but not at the beginning of each sub-event. A further difference with the Law et al. algorithm is that the simulation algorithm of the present invention is combined with graphical animation techniques, as described below.

The viewer's computer displays an animation of each sub-event by using techniques derived from those used in computer-based animation. The basic principle is described, for example, by Kingslake ("An Introductory Course in Computer Graphics", Richard Kingslake, Cartwell-Bratt, 1986): At page 93 of the textbook, Kingslake states: "When we watch a film it appears that the motion on the screen is smooth and continuous. However, if a piece of film is examined, it can be seen that it actually consists of a great number of individual pictures each one differing from the previous in only a very small way. The reason that, when projected, it appears to produce motion is because of a phenomenon known as persistence of vision. Any picture presented to the eye is retained for a short period of time. If another picture arrives during that period, then it appears to be a continuation of the previous one. If the new picture is slightly different from the first, then to the eye it appears that the picture has moved—hence: moving pictures." Thus, in the present invention, each sub-event is animated by displaying a sequence of pictures, giving the viewer the illusion of physical actions and movements.

The sequence of pictures for a sub-event may be produced using any of the well-known computer-based animation techniques. For example, Burger et al. discuss the "sprite" technique, ("Interactive Computer Graphics," Burget et al. Addison-Wesley, 1989, pp. 437–438), "Movement of a small object in the foreground of a scene is one example of a frame buffer technique widely used in arcade video games. Such objects are sometimes called 'sprites'. The required operations are, firstly, saving the area of the screen where the sprite is to be written, then writing the sprite, and finally, restoring the background, before repeating the operations with the sprite in its next position. Thus, the movement only requires the updating of a small portion of the raster. The availability of raster operations in modern graphics systems makes this type of animation very fast."

In the present invention, the viewer's computer could show a background image, representative of the visual appearance of the setting in which the real event takes place, as well as sprites for each participant in the real event. The position and appearance of each sprite is updated as simulated time passes, according to the actions of the sub-event being displayed.

These two primary functions of the viewer's computer, namely, maintaining a description of the status of the real event, and displaying an animation of the real event, are performed by a single combined algorithm. The algorithm is applied to each sub-event in a sequence of sub-events which constitute the description of an event.

Figure 11:
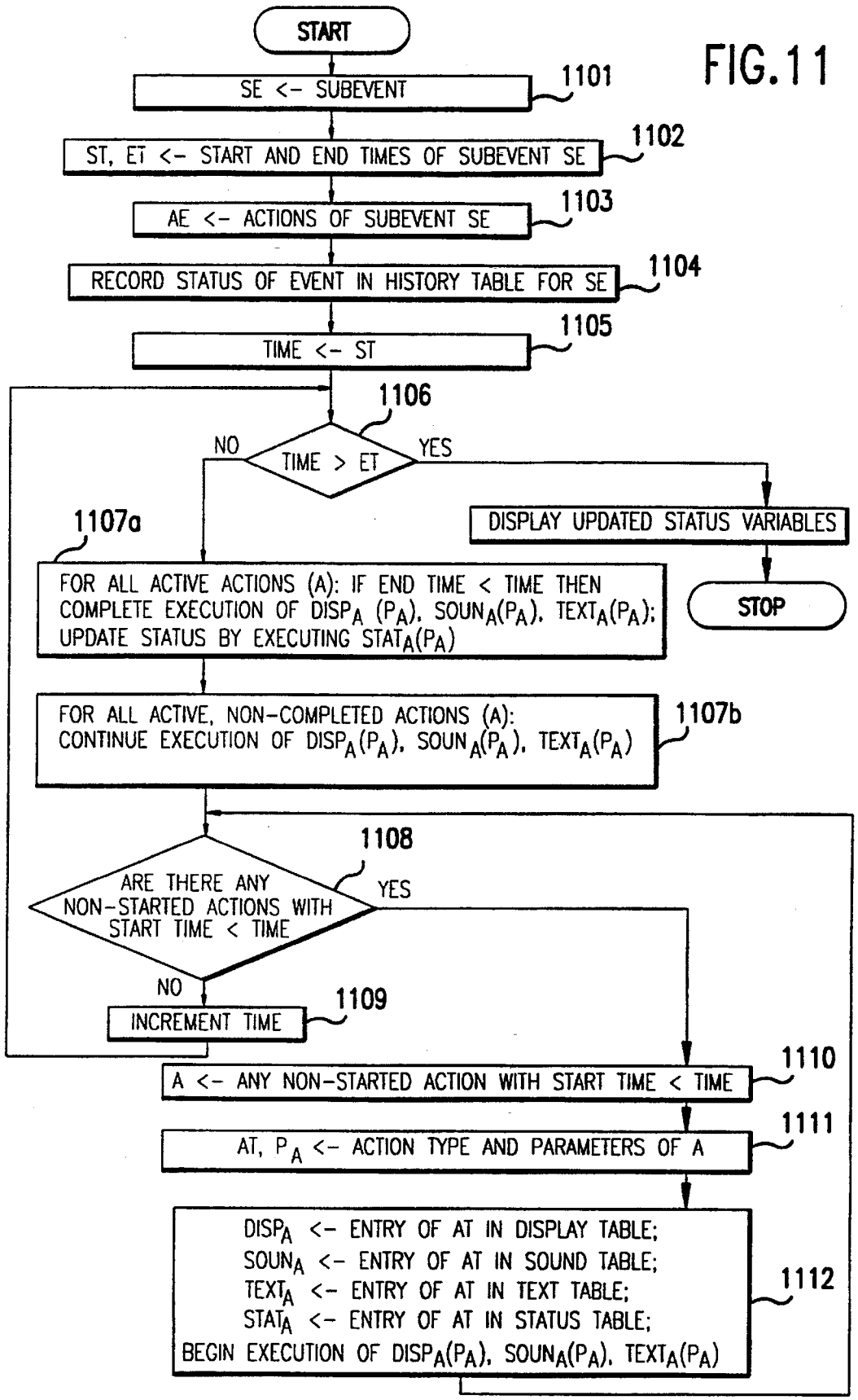
FIG. 11 is a flow chart representing an algorithm for simulation of sub-events at a viewer location in accordance with the method of the present invention.

The algorithm used by the viewer's computer is based on standard discrete-event simulation algorithms (such as that shown by Law et al. in FIG. 1.2 at p. 7). The algorithm in FIG. 11 relies on four tables, each indexed by the types of action that may occur (in the same way that the "event routines" are indexed by "event types" in the Law et al. algorithm). One table, the display table, has entries that describe how to display actions of that type. The second table, the sound table, has entries that describe how to generate appropriate sounds for actions of that type. The third table, the text table, has entries that describe how to produce a textual description of actions of that type. The entries in these three tables all describe procedures that can be executed incrementally for each step of the time variable. The procedures are implemented using techniques well known in the art, such as the animation techniques discussed in "Computer Animation with Scripts and Actors" by Reynolds in Computer Graphics, July 1982, Vol. 16, No. 3, pp. 289 to 296, and in "High-Performance Graphics in C: Animation and Simulation" by Adams, Windcrest Books, 1988 pp. 207–328, and can be implemented using well-known techniques. For example, if the "sprite" technique is used for animation, then the entry in the display table would include procedures for changing the position and appearance of the sprites corresponding to the participants in the action. Similarly, an entry in the sound table would use standard sound and speech synthesis techniques (for example, as embodied in commercial products such as "MacInTalk"). An entry in the text table could use "simple techniques based on pre-stored text and uncomplicated substitutes" ("Natural Language Generation Systems", McDonald et al. (eds), Springer-Verlag, 1988, p. vii), in which action parameters are substituted into phrases and sentences corresponding to the type of action. The central idea is to use the time status variable as a simulated clock. The clock variable is repeatedly incremented. Whenever the time variable exceeds the start time of one of the actions of the sub-event, the animation for that action is started. Whenever the time variable exceeds the end time of one of the actions that has started, the animation for that action is completed and the status variables are updated according to the action. Otherwise, all active animated actions are continued for each step of the time variable. FIG. 11 shows a flow chart for the combined algorithm. The fourth table, the status table, has entries that describe how actions of that type affect the status variables of the event. The entries in the status table correspond to the "event routines" discussed by Law et al. with different types of actions corresponding to different "event types". The procedures are similar to the "event routines" of Law et al. Entries in all of the tables rely on parameters associated with the action type. The algorithm also creates an entry in a fifth table, a history table, indexed by sub-event number.

In FIG. 11, initially, at step 1101, the sub-event is defined as 1102, the start time of SE is set as ST and the end time is set as ET. The set of actions of SE is defined as AE in step, 1103. The status of the event prior to SE is stored in the history table in step 1104. In step 1105, the status of the variable utilized to indicate time is updated in view of ST. In decision step 1106, the viewer's computer determines whether the time is greater than the designated end time of the subevent. If not, then the algorithm proceeds to step 1107a, at which step for all active actions (A) where the end time has been exceeded the execution of $Disp_A(P_A)$, $Soun_A(P_A)$ and $Text_A(P_A)$ is completed and the status is updated by executing $Stat_A(P_A)$. For all active non-completed actions the execution of $Disp_A(P_A)$, $Soun_A(P_A)$ and $Text_A(P_A)$ is continued in step 1107b.

In step 1108 a decision is made as to whether there are any non-started actions that have a start time less than the designated time. If it is detected that there are no such actions, the time is incremented in step 1109 and the algorithm returns to the decision step of 1106. If there are any nonstarted actions detected at step 1108, one such action is identified in step 1110 and the action type and parameters of that action are identified in step 1111. The entries in the DISP, SOUN, TEXT and STAT tables corresponding to the action type are accessed and execution of $Disp_A(P_A)$, $Sound_A(P_A)$, and $Text_A(P_A)$ will begin in step 1112.

Figure 12:
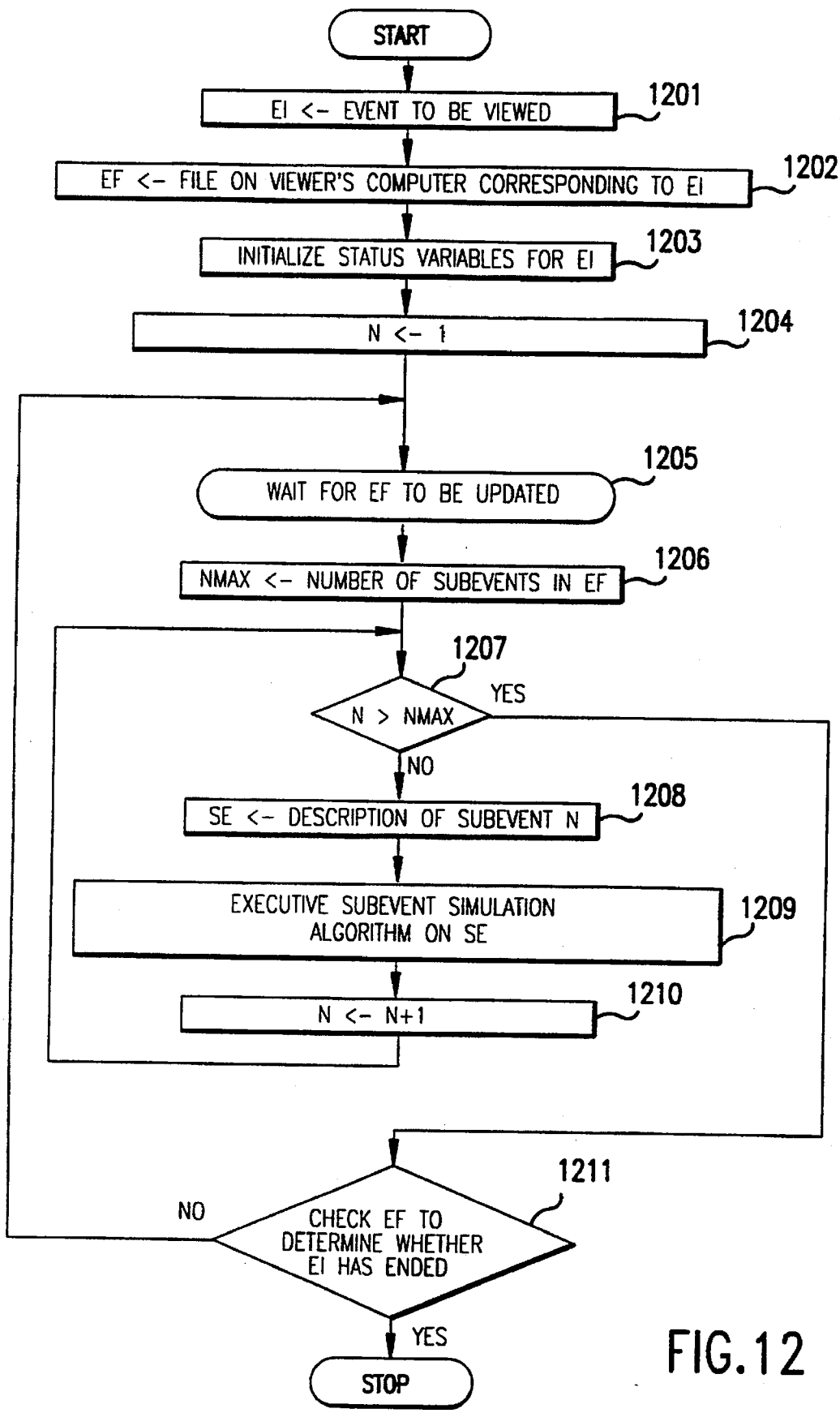
FIG. 12 is a flow chart representing a simulation algorithm for an entire event at a viewer location in accordance with the method of the present invention.

The simulation of an entire event is accomplished by repeating the basic algorithm for simulating a sub-event as set forth in the flow chart of FIG. 11. A flow chart corresponding to an algorithm for complete event simulation is set forth in FIG. 12. At step 1201, EI is defined as the event which is to be viewed, while in step 1202, EF is defined as the file on the viewer's computer that corresponds to EI. In step 1203, the status variables for EI are initialized. A variable N is set to equal 1 at step 1204. The viewer's computer then waits for EF to be updated at step 1205. The variable NMAX is defined as the number of sub-events in the updated file EF, as set forth in step 1206. In decision step 1207, the number N is compared to NMAX. If the value of N is not greater than NMAX, then a sub-event description for sub-event N is set, from file EF, as SE in step 1208 and the sub-event simulation algorithm of FIG. 11 can then be executed with respect to SE as defined at step 1209. The variable N is then incremented by 1 at step 1210, and the decision step of 1207 is repeated. This loop is continued until the variable N exceeds NMAX, at which point a new decision step 1211 occurs, whereby the file corresponding to the event EF is checked to see whether the event has ended. If not, the algorithm returns to that portion which defines a WAIT operation, waiting for EF to be updated at step 1205. If the event has been concluded, then the simulation is concluded.

By using the basic sub-event algorithm in a variety of different ways, the viewer's computer gives the viewer considerable flexibility. For instance, sub-events may be viewed from different perspectives by changing the background image and letting the entries in the display table depend upon the background image, as discussed above. In addition, any sequence of sub-events may be resimulated at any later time by restoring the status of the event from the history table and executing the algorithm of FIG. 11, starting with the first sub-event to be re-simulated. Furthermore, the entire event or selected subevents may be simulated at a faster rate of speed, by simply displaying the statue associated with a sub-event after each sub-event, rather than displaying all of the details of all of the actions associated with a given sub-event.

Just as the algorithms of the centralized data base computer will be best implemented utilizing a multi-processing technique, so will the algorithms associated with the viewer's computer be best implemented by using a multi-processing technique. As illustrated in schematic block diagram form in FIG. 13, data base 1301 of the viewer's computer is capable of receiving update information and controlling the display of information to a viewer. In particular, process 1302 receives sub-event descriptions from the centralized data base computer, and updates the data base 1301. The updated data base is then used to update the status and also to display sub-events in accordance with the algorithms of FIG. 11 according to process 1303.

Figure 13:
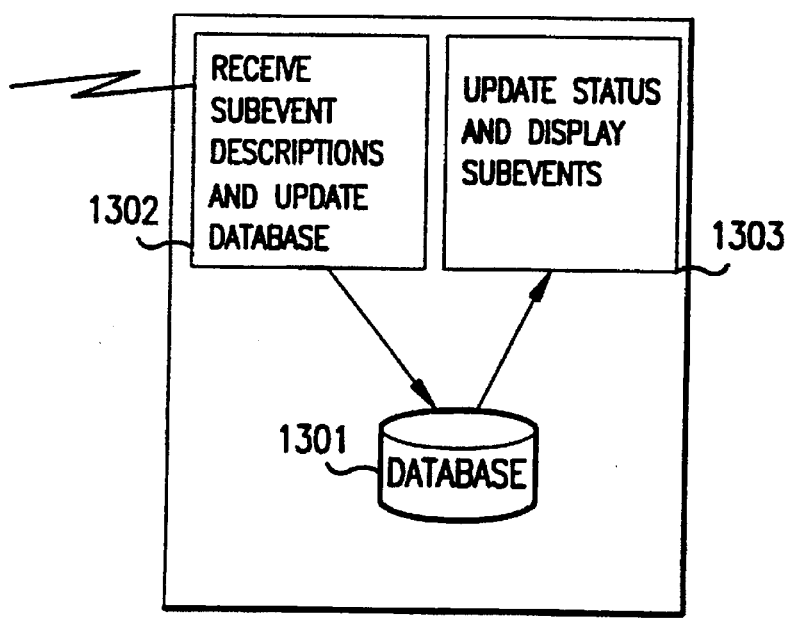
FIG. 13 illustrates in schematic form multi-processing on a viewer's computer in accordance with the method of the present invention.

The multi-processing techniques of FIGS. 10 and 13 are familiar to those skilled in the art of discrete event simulation techniques.

It will be possible to run the software for viewing the event on either a general purpose computer or a special purpose computer. The viewer computer may also take the form of a portable, or pocket-sized computer that will have the full functional capability of presenting the broadcasted live event as video images, audio images, or text or some combination thereof.

As an example to illustrate the broadcast method of the present invention, the application of the method to a half inning of a baseball game will now be described. The actions of the half inning are as follows:

At the end of the eighth inning, the home team is ahead of the visiting team by a score of 3-1. During the top of the ninth inning, the first batter for the visitors will ground out, but the next batter will walk, steal second, and score on a close play at home after the third batter singles. The fourth batter will hit a long fly ball, deep to left field. If it goes out of the park, two runs will score and the visitors will take the lead, but it is finally caught at the wall by the left fielder, and the home team wins the game.

Some of the action types that appear in this example are described below in Table I with their parameters:

TABLE I

| | |
|---|---|
| Strike | (no parameters) |
| Ball | (no parameters) |
| GroundBall | Location |
| FlyBall | Location |
| ForceOut | Base, Runner, Fielder |
| StolenBase | Runner, Base |
| FieldedBall | Fielder, Location |
| CaughtFlyBall | Fielder, Location |
| ThrownBall | Thrower, Receiver |
| RunToBase | Runner, Base |

A portion of the textual representation of the game is given below. The sub-events correspond to the first batter:
Game 14 2 8 True 2 3 8
. . . sub-events prior to beginning of ninth inning
{178 15:47:15 15:47:16
[0:00:00 0:00:01 Ball]}
{179 15:47:30 15:47:34
[O: 00: 00 O: 00: 03 GroundBall LeftInf ield]
[O: 00: 01 0: 00: 04 RunToBase Batter FirstBase]
[O: 00: 03 0: 00: 03 FieldedBall Shortstop]
[O: 00: 03 0: 00: 04 ThrownBall Shortstop FirstBaseman]
[O: 00: 04 0: 00: 04 ForceOut FirstBase Batter FirstBaseman]}

"Game 1428" is the unique identifying code for this particular baseball game; "True" indicates that the game is still in progress; "238" indicates there have been 238 sub-events so far. Sub-event 178 lasted only 1 second and consisted of a single action, namely, the pitcher throwing a ball. Subevent 179 lasted for 4 seconds, and consisted of 5 actions; the batter hitting the ball on the ground in the left infield toward the shortstop (3 seconds), the batter running toward first base (3 seconds), the shortstop fielding the ball (0 seconds), the shortstop throwing the ball to the firstbaseman (1 second), and the batter being forced out at first base by the firstbaseman (0 seconds).

As described above with respect to the algorithm in FIG. 3, the observer could type in all of this information when prompted by the observer's computer. Alternatively, the computer could have special codes for commonly occurring subevents. For example, to record the second sub-event for the first batter (sub-event 179 in this example), the observer could simply indicate that the batter grounded out to the shortstop. The computer could then refer to a table of standard plays and automatically construct the actions indicated above.

For simulation on the viewer's computer, the status of the example baseball game consists of 11 status variables. These variables are given in Table II, along with an indication of how they could be displayed on the viewer's computer.

TABLE II

| Time | Graphical depiction of a clock with the current time |
|---|---|
| HomeScore | Textual entry at a specific location |
| VisitorScore | Textual entry at a specific location |
| InningNumber | Textual entry at a specific location |
| TeamAtBat | Textual entry at a specific location |
| Outs | Textual entry at a specific location |
| Balls | Textual entry at a specific location |
| Strikes | Textual entry at a specific location |
| RunnerOnFirst | Graphical depiction of a player on first base |
| RunnerOnSecond | Graphical depiction of a player on second base |
| RunnerOnThird | Graphical depiction of a player on third base |

Figure 14:
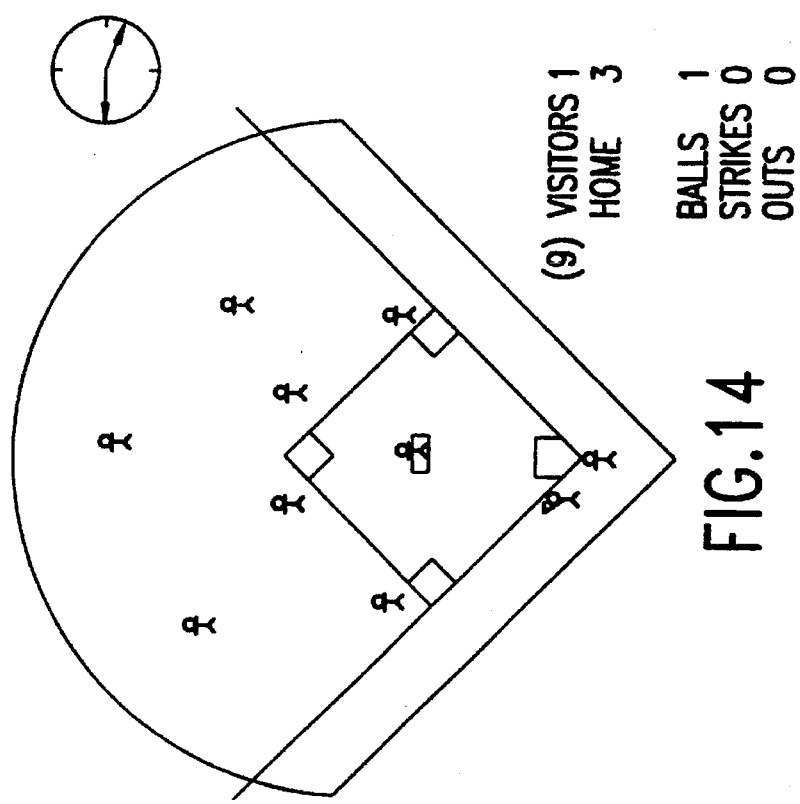

For example, FIG. 14 shows the viewer computer screen after sub-event 178 of the example game.

Figure 15:
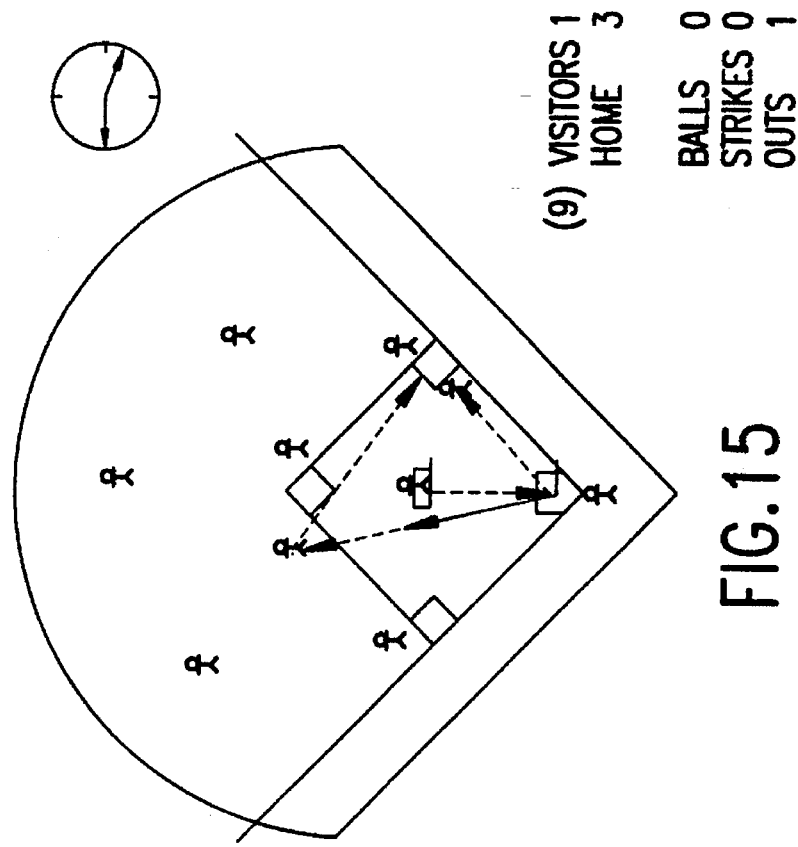
FIGS. 14 to 19 illustrate graphic representations corresponding to an example of the use of the present invention.

FIG. 15 shows the viewer computer screen after sub-event 179. The dashed arrows indicate motions (of the ball or of players) that occurred to simulate the various actions of the sub-event.

The last sub-event of the inning illustrates the use of the display, sound, and text tables. The sub-event would be represented textually as follows:
{196 15:53:30 15:53:40
[0:00:00 0:00:07 FlyBall DeepLeftOutfield]
[0:00:01 0:00:04 RunToBase Batter FirstBase]
[0:00:01 0:00:04 RunToBase FirstRunner SecondBase]
[0:00:04 0:00:07 RunToBase Batter SecondBase]
[0:00:04 0:00:07 RunToBase FirstRunner ThirdBase]
[0:00:07 0:00:07 CaughtFlyBall DeepLeftOutfield LeftFielder]}
The tables for the relevant action types are as follows:

FlyBall (Location)

Disp: swing bat; move ball from home plate toward Location
Text: if Location is deep, then "it's a long fly ball, deep to Location . . . "
Soun: crack sound of wood on ball; if Location is deep, and batter is visitor, then gasp and silence RunTowardBase (Runner, Base)

Disp: move Runner toward Base
Text: (no entry)
Soun: (no entry)

CaughtFlyBall (Fielder, Location)

Disp: move Fielder to Location, move ball to Location
Text: "caught by Fielder"
Soun: if Location is deep, and batter is visitor, then loud cheers FIGS. 16–19 show the viewer's computer display, text, and sound output at various times during the simulation of sub-event 196.

Figure 16:
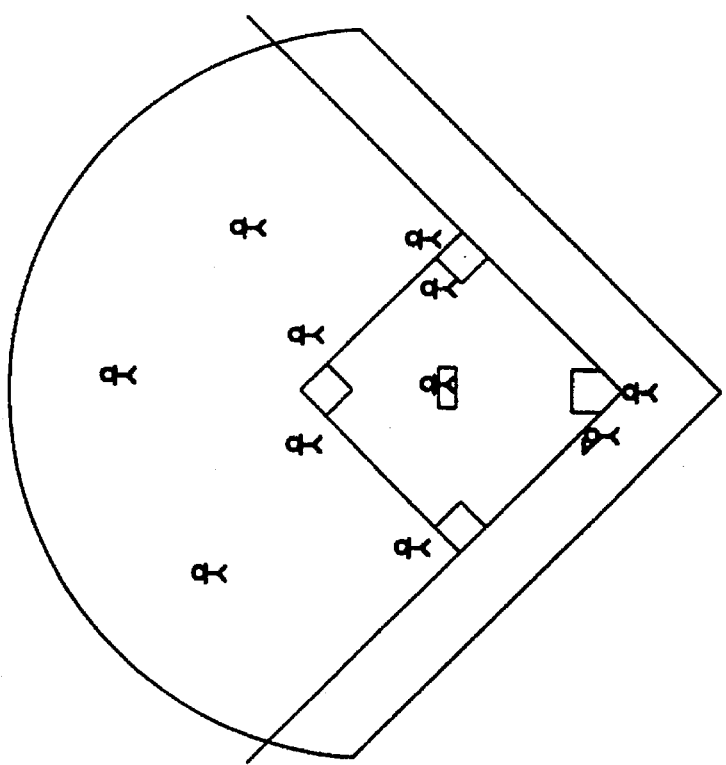

FIG. 16 illustrates the computer display prior to sub-event 196.

Figure 17:
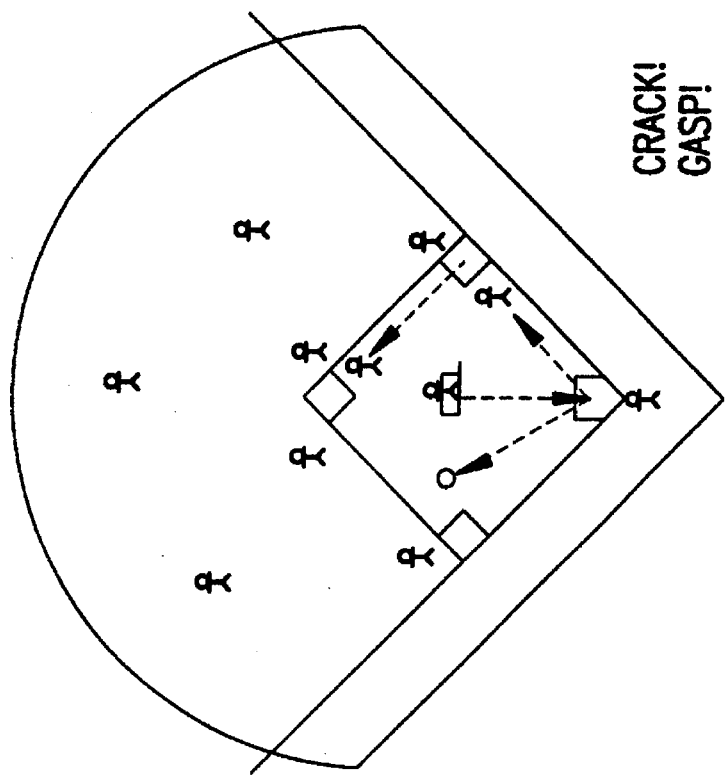

FIG. 17 illustrates the computer display 2 seconds after the sub-event begins.

Figure 18:
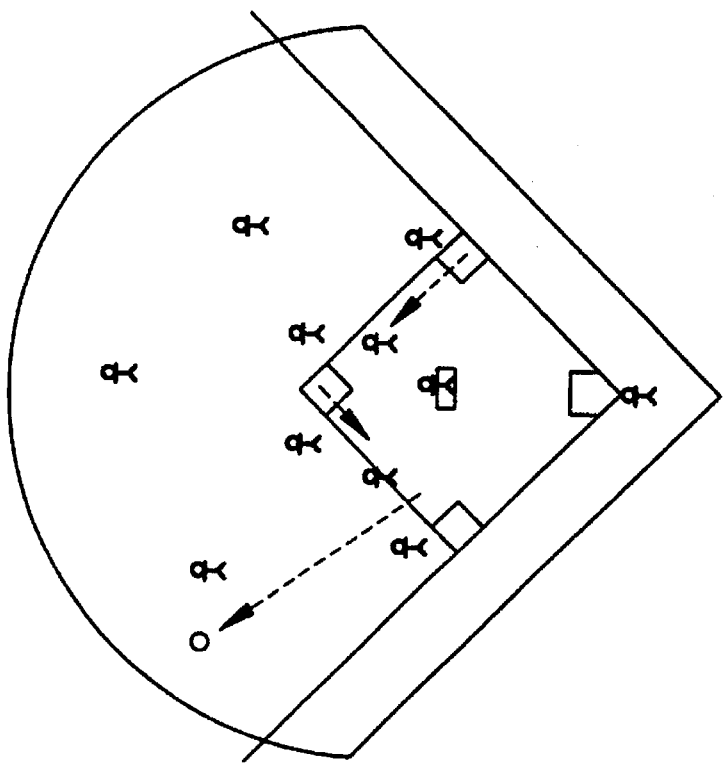

FIG. 18 illustrates the computer display 5 seconds after the sub-event begins.

Figure 19:
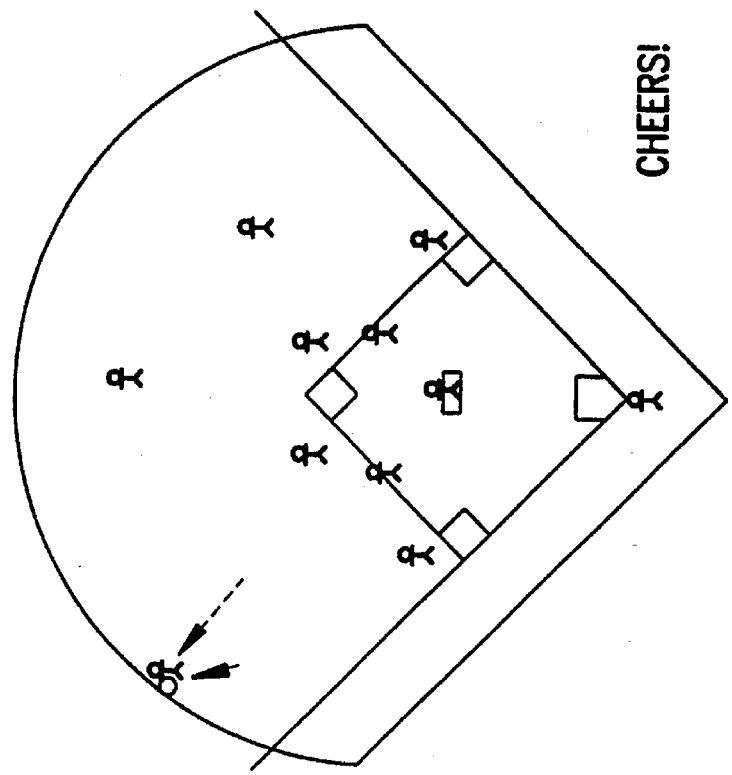

FIG. 19 illustrates the computer display 7 seconds after the sub-event begins.

The present invention has been described in terms of basic algorithms and computer elements which can be utilized to carry out a broadcast of live events utilizing computer simulation techniques, where the techniques are familiar to those in the art.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of broadcasting information about a live event that is composed of a sequence of discrete sub-events wherein a set of rules governs the event so that a status change resulting from the occurrence of a sub-event is determined by the set of rules, comprising the steps of:

creating a set of symbols useful in a computer simulation, wherein each symbol is representative of an action involving physical exertion and skill;

generating a sequence of symbolic descriptions, each description being a representation of one of the discrete sub-events, and includes at least one symbol from said set of symbols wherein said symbol may be used in a computer simulation to effect a change in an indicated status of an event in connection with a computer simulation program that operates in accordance with the set of rules governing the event;

creating a database file corresponding to the event;

updating said database file using the generated sequence of symbolic descriptions;

creating transmission data from the generated sequence of symbolic descriptions; and broadcasting said transmission data.

2. The method of claim 1, in which each said symbolic description includes at least one action description, each action description including a value for at least one parameter associated with said action description.

3. The method of claim 1 further comprising the steps of:

creating a predetermined discrete set of action codes representative of a finite set of actions which can occur during the live event; and predetermining a set of parameters for each of said action codes.

4. The method of claim 1 wherein said step of generating occurs at a first location remote from said step of creating a database file, and wherein said step of updating comprises the step of automatically transmitting said symbolic descriptions representing a sub-event from said first location to said database file.

5. The method of claim 1 wherein said sequence of symbolic descriptions is generated by a computer based on inputs received, said inputs describing the actions that comprise the live event and wherein said symbolic descriptions are source information for a computer simulation of the live event.

6. The method of claim 5 wherein said step of generating occurs at a first location remote from said step of creating a database file and wherein said step of updating comprises the step of automatically transmitting said symbolic descriptions representing a sub-event, from said first location to said database file.

7. The method of claim 1 wherein said step of creating transmission data includes computing state variables using said generated sequence of symbolic descriptions.

8. A method for simulating a live event that is composed of a sequence of discrete sub-events at a viewer computer at a location different from the location of the live event, with the event being governed by a set of rules that predetermines the consequences of actions that define the sub-events, comprising the steps of:

creating a set of symbols useful in a computer simulation, wherein each symbol is representative of an action involving physical exertion and skill;

generating a sequence of symbolic descriptions wherein each symbolic description is a representation of a discrete sub-event of the live event and includes at least one symbol from said set of symbols, wherein an indicated status of the event may be affected by an action described by the symbol;

creating a database file corresponding to the event;

updating said database file using said generated sequence of symbolic descriptions;

creating transmission data from said generated sequence of symbolic descriptions;

broadcasting said transmission data;

receiving the broadcasted transmission data at the viewer computer;

storing the received transmission data; and generating a computer simulation of the live event at the viewer computer using said received transmission data.

9. The method of claim 8 wherein each sub-event comprises a plurality of actions and each action has associated therewith at least one parameter and wherein each symbolic description includes a separate value for each parameter associated with a given action.

10. The method of claim 8 wherein said symbolic description is generated on an observing computer and said data base file is located at a location distinct from the observing computer.

11. The method of claim 10 wherein the viewer computer, at a location distinct from that of the live event is also at a location distinct from that of said database file and further includes a viewer event file, which is periodically updated with information from said database file.

12. The method of claim 8 wherein said step of creating transmission data includes computing state variables using said generated sequence of symbolic descriptions.

13. A method for broadcasting information about a plurality of live events, each composed of a sequence of discrete sub-events, wherein a set of rules governs the plurality of live events so that a status change in one event that results from the occurrence of a sub-event in said one event is determined by the set of rules comprising the steps of:

creating a database file corresponding to each of said plurality of events;

creating a set of symbols useful in a computer simulation, wherein each symbol is representative of an action involving physical exertion and skill;

generating, for each of said plurality of events, a sequence of symbolic descriptions, each description being a representation of one of the discrete sub-events of said event and includes at least one symbol from said set of symbols wherein said symbol may be used in a computer simulation to effect a change in an indicated status of an event in connection with a computer simulation program that operates in accordance with the set of rules governing the event;

updating each database file that corresponds to one of said plurality of events using a sequence of symbolic descriptions associated with the event that corresponds to that database file;

creating transmission data from information stored in an updated database file; and broadcasting said transmission data.

14. The method of claim 13, in which each said symbolic description includes at least one action description, each action description including a value for at least one parameter associated with an action.

15. The method of claim 14, wherein said step of broadcasting comprises the step of automatically transmitting updated contents of said database files along a multiplexed communication channel.

16. The method of claim 14, wherein said step of broadcasting comprises the steps of:

receiving a request from a viewer computer for access to a database file corresponding to one of said plurality of events and transmitting an update of the requested database file to the requesting viewer computer.

17. The method of claim 13 wherein said step of creating transmission data includes computing state variables using said generated sequence of symbolic descriptions.

18. A system for simulating a live event, composed of a sequence of discrete sub-events wherein a set of rules governs the event so that a status change resulting from the occurrence of a sub-event is determined by the set of rules, at a computer of a viewer at a location distinct from the location of the event, comprising:

an observer computer generating a sequence of symbolic descriptions from a set of symbols useful in a computer simulation, wherein each symbol is representative of an action involving physical exertion and skill and wherein, each description is a representation of one of the sub-events said representation being useful in a computer simulation to effect a change in an indicated status of an event in connection with a computer simulation program that operates in accordance with the set of rules governing the event;

a centralized database receiving and storing information corresponding to said sequence of symbolic descriptions in a file corresponding to the event; and a viewer computer, receiving data representative of said sequence of symbolic descriptions, and including an event simulator, said event simulator producing a simulation of said event using said data representative of said sequence of symbolic descriptions.

* * * * *

UNITED STATES PATENT AND TRADEMARK OFFICE
CERTIFICATE OF CORRECTION

PATENT NO. : 5,671,347
DATED : 23 September 1997
INVENTOR(S) : David R. BARSTOW et al.

It is certified that error appears in the above-identified patent and that said Letters Patent is hereby corrected as shown below:

| Column | Line | |
|---|---|---|
| 13 | 67 | Change "statue" to --status--. |

Signed and Sealed this

Twenty-fourth Day of February, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,671,347
DATED : September 23, 1997
INVENTOR(S) : David R. Barstow et al.

It is certified that error appears in the above-identified patent and that said Letters Patent is hereby corrected as shown below:

Column 1,
Line 10, change "abandoned" to -- abandoned, and application Ser. No. 07/641,716 filed Jan. 15, 1991, U.S. Pat. No. 5,189,630 --.

Signed and Sealed this

Fifth Day of February, 2002

Attest:

JAMES E. ROGAN
Attesting Officer    Director of the United States Patent and Trademark Office

UNITED STATES PATENT AND TRADEMARK OFFICE
CERTIFICATE OF CORRECTION

PATENT NO.     : 5,671,347
DATED          : September 23, 1997
INVENTOR(S)    : David R. Barstow et al.

It is certified that error appears in the above-identified patent and that said Letters Patent is hereby corrected as shown below:

<u>Column 1,</u>
Line 10, change "abandoned" to -- abandoned, and application Ser. No. 07/641,716 filed Jan. 15, 1991, U.S. Pat. No. 5,189,630 --.

Signed and Sealed this

Twentieth Day of August, 2002

Attest:

Attesting Officer

JAMES E. ROGAN
*Director of the United States Patent and Trademark Office*